United States Patent
Zheng et al.

(10) Patent No.: US 9,227,847 B2
(45) Date of Patent: Jan. 5, 2016

(54) METHOD FOR PREPARING VANADIUM-NITROGEN ALLOY

(71) Applicant: Jianwei Zheng, Hangzhou (CN)

(72) Inventors: Jianwei Zheng, Hangzhou (CN); Zhongfang Ying, Dongyang (CN)

(73) Assignee: Jianwei Zheng, Hangzhou (CN)

( * ) Notice: Subject to any disclaimer, the term of this patent is extended or adjusted under 35 U.S.C. 154(b) by 102 days.

(21) Appl. No.: 14/049,242

(22) Filed: Oct. 9, 2013

(65) Prior Publication Data

US 2014/0037530 A1 Feb. 6, 2014

Related U.S. Application Data

(63) Continuation-in-part of application No. PCT/CN2012/000148, filed on Feb. 6, 2012.

(30) Foreign Application Priority Data

Apr. 12, 2011 (CN) .......................... 2011 1 0090241

(51) Int. Cl.
| | |
|---|---|
| C01B 21/06 | (2006.01) |
| B22F 1/02 | (2006.01) |
| B22F 9/20 | (2006.01) |
| C22C 1/10 | (2006.01) |
| C22C 5/02 | (2006.01) |
| C22C 5/04 | (2006.01) |
| C22C 5/06 | (2006.01) |
| C22C 29/16 | (2006.01) |

(52) U.S. Cl.
CPC ............... *C01B 21/0617* (2013.01); *B22F 1/02* (2013.01); *B22F 9/20* (2013.01); *C22C 1/10* (2013.01); *C22C 5/02* (2013.01); *C22C 5/04* (2013.01); *C22C 5/06* (2013.01); *C22C 29/16* (2013.01); *B22F 2999/00* (2013.01)

(58) Field of Classification Search
None
See application file for complete search history.

(56) References Cited

U.S. PATENT DOCUMENTS 3,565,610 A * 2/1971 Hans .............................. 420/127
4,394,161 A * 7/1983 Hannum ....................... 423/409

FOREIGN PATENT DOCUMENTS

CN 200910181086 A * 10/2009

* cited by examiner

*Primary Examiner* — Guinever S Gregorio
(74) *Attorney, Agent, or Firm* — Matthias Scholl, PC; Matthias Scholl

(57) ABSTRACT

A method for preparing vanadium-nitrogen alloy, the method including: 1) mixing and pressing a vanadium-containing compound, an agglutinant, and a carbon-premixed reducing agent to yield a spherical raw material, and air drying the spherical raw material; and 2) mixing the spherical raw material with a granular carbonaceous reducing agent to yield a mixture, and continually feeding the mixture into a shaft kiln of a medium frequency induction furnace, purging the shaft kiln with pure nitrogen and maintaining a furnace pressure at between 0.01 and 0.03 mPa, drying the mixture at a temperature of between 100 and 600° C., carbonizing and nitriding at a temperature of between 900 and 1350° C., cooling the resulting product to less than 100° C., and discharging the product.

10 Claims, No Drawings

METHOD FOR PREPARING VANADIUM-NITROGEN ALLOY

CROSS-REFERENCE TO RELATED APPLICATIONS

This application is a continuation-in-part of International Patent Application No. PCT/CN2012/000148 with an international filing date of Feb. 6, 2012, designating the United States, now pending, and further claims priority benefits to Chinese Patent Application No. 201110090241.6 filed Apr. 12, 2011. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 14781 Memorial Drive, Suite 1319, Houston, Tex. 77079.

BACKGROUND OF THE INVENTION

1. Field of the Invention

The invention relates to the field of ferrous metallurgy, and more particularly to a method for preparing a vanadium-nitrogen alloy free of conglutination and oxidation after sintering.

2. Description of the Related Art

Typically, the following two methods are employed to manufacture a vanadium-nitrogen alloy. One is to employ a pusher kiln for continuous manufacturing of a vanadium-nitrogen alloy. The method involves high production costs and large energy consumption. And during manufacturing, the temperature rise, the temperature fall, and the maintenance each takes about one month. Thus, the manufacturing time is only about 8 months one year, with low efficiency. The other method is to adopt a shaft kiln heated by medium frequency. For example, vanadium pentoxide or vanadium trioxide, and carbonaceous reducing agent or graphite, are employed as raw materials to prepare balls. The balls are put into a medium frequency induction furnace for reduction for between 2.5 and 3.5 hours in the presence of nitrogen having a flow rate of 10 $m^3$/H, at 1350±100° C., and a vanadium-nitrogen alloy is obtained. However, the sintered vanadium-nitrogen alloys conglutinate with each other and thus cannot fall automatically into the storage chamber. Thus, the manufacturing cannot be conducted continually. After each feeding, the temperature rise and temperature fall must be conducted again. The method has high production cost, high energy consumption, and low efficiency.

SUMMARY OF THE INVENTION

In view of the above-described problems, it is one objective of the invention to provide a method for preparing a vanadium-nitrogen alloy free of conglutination and oxidation after sintering. The method is capable of feeding raw materials and discharging products continually, and can significantly reduce the production costs and improve the production efficiency.

To achieve the above objective, in accordance with one embodiment of the invention, there is provided a method for preparing a vanadium-nitrogen alloy free of conglutination and oxidation after sintering, the method comprising:

a) mixing and pressing a vanadium-containing compound, an agglutinant, and a carbon-premixed reducing agent to yield a spherical raw material having a diameter of between 30 and 60 mm, and air drying the spherical raw material, a mixing ratio of components being as follows: the vanadium-containing compound, 100 parts by weight; the carbon-premixed reducing agent, between 15 and 30 parts by weight; the agglutinant, between 3 and 12 parts by weight; and b) mixing the spherical raw material and between 30 and 100 parts by weight of a granular carbonaceous reducing agent to yield a mixture, and continually feeding the mixture into a shaft kiln of a medium frequency induction furnace, purging the shaft kiln with pure nitrogen and maintaining a furnace pressure at between 0.01 and 0.03 MPa above atmospheric pressure, drying the mixture at a temperature of between 100 and 600° C., carbonizing and nitriding at a temperature of between 900 and 1350° C., cooling a resulting product to be less than 100° C., and discharging, the feeding of the mixture and the discharging of the product being carried out once every 6-8 hours.

In a class of this embodiment, the vanadium-containing compound is vanadium pentoxide or vanadium trioxide.

In a class of this embodiment, the carbon-premixed reducing agent is graphite powder, carbon powder, or a mixture thereof.

In a class of this embodiment, the granular carbonaceous reducing agent is a granular activated carbon, waste carbon rod, graphite carbon additive, or a mixture thereof. Preferably, the granular activated carbon has a particle size of between 2 and 10 mm.

Advantages of the invention are summarized as follows. The granular carbonaceous reducing agent is employed as raw materials, which separates the crude ball from each other, and thus, the heat transfer is strengthened, the temperature rises rapidly, the electric charge is saved. Furthermore, due to the separation of the crude balls, the feeding of the raw materials and the discharge of the products operates continually, thereby significantly reducing the production costs and improving the production efficiency.

DETAILED DESCRIPTION OF THE EMBODIMENTS

Detailed description of the invention will be given below in conjunction with examples.

Example 1

100 kg of 98% vanadium pentoxide powder, 22 kg of graphite powder (100 meshes), and 6 kg of an agglutinant were uniformly mixed, and pressed by using a high pressure compressor to yield crude balls having a diameter of 50±0.5 mm. The balls were air dried for 3-5 days. The air dried crude balls were mixed with 80 kg of a granular activated carbon having a particle size of between 2 and 4 mm and the resulting mixture was put into a shaft kiln of a medium frequency induction furnace through an automatic feeding system. The mixture was preheated by the upper part of the induction furnace and then fell into the middle part thereof for heating. 99.999% (v/v) nitrogen was introduced into the induction furnace from a cooling end thereof at a flow rate of 14 $m^3$/h. The middle part of the induction furnace was controlled at 1200±100° C. by using an infrared radiation thermometer. After 4 hours' reaction, a resulting product fell into a jacketed cooling chamber of the induction furnace, cooled by water, and discharged from an automatic discharging system. Another 4 hours later, a second batch of the crude balls and granular activated carbon was put into the induction furnace by the automatic feeding system. During the second feeding, the temperature of the upper part of the induction furnace was controlled at between 400 and 650° C. for consecutive production, and the obtained product comprised 77.8% of V, 14.5% of N, and 2.4% of C.

Example 2

100 kg of 98% vanadium trioxide powder, 22 kg of graphite powder (100 meshes), and 4 kg of an agglutinant were uniformly mixed, and pressed by using a high pressure compressor to yield crude balls having a diameter of 50±0.5 mm. The balls were air dried for 3-5 days. The air dried crude balls were mixed with 50 kg of a granular activated carbon having a particle size of between 4 and 8 mm and the resulting mixture was put into a shaft kiln of a medium frequency induction furnace through an automatic feeding system. The mixture was preheated by the upper part of the induction furnace and then fell into the middle part thereof for heating. 99.999% (v/v) nitrogen was introduced into the induction furnace from a cooling end thereof at a flow rate of 8 m$^3$/h. The middle part of the induction furnace was controlled at 1200±100° C. by using an infrared radiation thermometer. After 3.5 hours' reaction, a resulting product fell into a jacketed cooling chamber of the induction furnace, cooled by water, and discharged from an automatic discharging system. Another 3.5 hours later, a second batch of the crude balls and granular activated carbon was put into the induction furnace by the automatic feeding system. During the second feeding, the temperature of the upper part of the induction furnace was controlled at between 600 and 750° C. for consecutive production, and the obtained product comprised 78.8% of V, 16.5% of N, and 1.4% of C.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A method for preparing a vanadium-nitrogen alloy free of conglutination and oxidation after sintering, the method comprising:
    a) mixing and pressing a vanadium-containing compound, an agglutinant, and a carbon-premixed reducing agent to yield a spherical raw material having a diameter of between 30 and 60 mm, and air drying the spherical raw material, the carbon-premixed reducing agent being graphite powder, carbon powder, or a mixture thereof, and a mixing ratio of components being as follows: the vanadium-containing compound, 100 parts by weight; the carbon-premixed reducing agent, between 15 and 30 parts by weight; the agglutinant, between 3 and 8 parts by weight; and
    b) mixing the spherical raw material and between 30 and 100 parts by weight of a granular carbonaceous reducing agent to yield a mixture, the granular carbonaceous reducing agent having a particle size of between 2 and 10 mm, and continually feeding the mixture into a shaft kiln of a medium frequency induction furnace, purging the shaft kiln with pure nitrogen and maintaining a furnace pressure at between 0.01 and 0.03 MPa above atmospheric pressure, drying the mixture at a temperature of between 100 and 600° C., carbonizing and nitriding at a temperature of between 900 and 1350° C., cooling a resulting product to be less than 100° C., and discharging, the feeding of the mixture and the discharging of the product being carried out once every 6-8 hours.

2. The method of claim 1, wherein the granular carbonaceous reducing agent is a granular activated carbon, waste carbon rod, graphite carbon additive, or a mixture thereof.

3. The method of claim 1, wherein the vanadium-containing compound is vanadium pentoxide or vanadium trioxide.

4. A method for preparing a vanadium-nitrogen alloy free of conglutination after sintering, the method comprising:
    a) mixing and pressing 100 parts by weight of a vanadium-containing compound, between 3 and 8 parts by weight of an agglutinant, and between 15 and 30 parts by weight of a carbon-premixed reducing agent to yield a spherical raw material, and air drying the spherical raw material, wherein the carbon-premixed reducing agent is graphite powder, carbon powder, or a mixture thereof; and
    b) mixing the spherical raw material and between 30 and 100 parts by weight of a granular carbonaceous reducing agent to yield a mixture, the granular carbonaceous reducing agent having a particle size of between 2 and 10 mm, continually feeding the mixture into a shaft kiln of a medium frequency induction furnace, purging the shaft kiln with pure nitrogen, drying the mixture, carbonizing and nitriding at a temperature of between 900 and 1350° C., cooling a resulting product, and discharging.

5. The method of claim 4, wherein the spherical raw material has a diameter of between 30 and 60 mm.

6. The method of claim 4, wherein drying the mixture in b) comprises drying the mixture at a temperature of between 100 and 600° C.

7. The method of claim 4, wherein cooling a resulting product in b) comprises cooling the resulting product to be less than 100° C.

8. The method of claim 4, wherein the granular carbonaceous reducing agent is a granular activated carbon, waste carbon rod, graphite carbon additive, or a mixture thereof.

9. The method of claim 4, wherein the vanadium-containing compound is vanadium pentoxide or vanadium trioxide.

10. The method of claim 4, wherein purging the shaft kiln with pure nitrogen is controlled at a rate of between 8 and 14 m$^3$/h.

* * * * *